United States Patent
Zahneisen et al.

(10) Patent No.: US 11,004,183 B2
(45) Date of Patent: May 11, 2021

(54) UN-SUPERVISED CONVOLUTIONAL NEURAL NETWORK FOR DISTORTION MAP ESTIMATION AND CORRECTION IN MRI

(71) Applicant: The Board of Trustees of the Leland Stanford Junior University, Stanford, CA (US)

(72) Inventors: Benjamin Zahneisen, Portola Valley, CA (US); Dominik Fleischmann, Palo Alto, CA (US); Kathrin Baeumler, Portola Valley, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 91 days.

(21) Appl. No.: 16/507,400

(22) Filed: Jul. 10, 2019

(65) Prior Publication Data

US 2020/0020082 A1    Jan. 16, 2020

Related U.S. Application Data

(60) Provisional application No. 62/696,235, filed on Jul. 10, 2018.

(51) Int. Cl.
*G06N 3/04* (2006.01)
*G06T 5/00* (2006.01)
(Continued)

(52) U.S. Cl.
CPC .............. *G06T 5/006* (2013.01); *G06F 17/15* (2013.01); *G06N 3/04* (2013.01); *G06T 7/0012* (2013.01)

(58) Field of Classification Search
CPC ........ G06F 17/15; G06N 3/04; G06N 3/0454; G06N 3/0481; G06N 3/084; G06N 3/082;
(Continued)

(56) References Cited

U.S. PATENT DOCUMENTS

2006/0133693 A1* 6/2006 Hunt ................. G06T 3/606
382/293
2008/0036792 A1* 2/2008 Liang ................ G06T 3/4007
345/660
(Continued)

OTHER PUBLICATIONS

Ronneberger et al. ("U-Net: Convolutional Networks for Biomedical Image Segmentation," International Conference on Medical image computing and computer-assisted intervention, 2015) (Year: 2015).*
(Continued)

*Primary Examiner* — Yubin Hung
(74) *Attorney, Agent, or Firm* — Lumen Patent Firm (57) ABSTRACT

A method for magnetic resonance imaging (MRI) includes performing an echo planar imaging acquisition using inverted up/down phase encoding directions and reconstructing acquired images having geometric distortions along the phase encoding directions due to off-resonant spins; feed-forward estimating by a convolutional neural network (CNN) a phase distortion map from the acquired images; where the CNN is trained to minimize a similarity metric between un-warped up/down image pairs; and performing geometric distortion correction of the acquired images using the phase distortion map to unwarp the acquired images.

5 Claims, 8 Drawing Sheets

(51) Int. Cl.
*G06T 7/00* (2017.01)
*G06F 17/15* (2006.01)

(58) Field of Classification Search
CPC .............. G06N 3/088; G06T 5/006; G06T 2207/10088; G06T 2207/20084
See application file for complete search history.

(56) References Cited

U.S. PATENT DOCUMENTS

2014/0361770 A1* 12/2014 Dannels ............ G01R 33/5611 324/309
2017/0186176 A1 6/2017 Paluri
2019/0162807 A1 5/2019 Zahneisen

OTHER PUBLICATIONS

Kybic et al. ("Unwarping of unidirectionally distorted EPI images," IEEE Trans. Medical Imaging, vol. 19, No. 2, Feb. 2000) (Year: 2000).*

Unser et al. ("B-spline signal processing—Part II: Efficient design and applications," IEEE Trans. Signal Processing, vol. 41, No. 2, Feb. 1993) (Year: 1993).*

Jaderberg et al. ("Spatial Transformer Networks," NIPS, 2015) (Year: 2015).*

Wang et al., Geometric Distortion in Structural Magnetic Resonance Imaging, Current Medical Imaging Reviews, 2005, 1, 49-60, 49.

Zahneisen et al. Extended hybrid-space SENSE for EPI: Off-resonance and eddy current corrected joint interleaved blip-up/down reconstruction. Neuroimage 153 (2017), 97-108.

Shan et al. Unsupervised End-to-end Learning for Deformable Medical Image Registration, 14 (2017), 1-12.

Fischer et al., FlowNet: Learning Optical Flow with Convolutional Networks. Iccv 8. (2015).

Dosovitskiy et al. Learning to Generate Chairs, Tables and Cars with Convolutional Networks. IEEE Trans. Pattern Anal. Mach. Intell. 39 (2017), 692-705.

de Vos et al. End-to-End Unsupervised Deformable Image Registration with a Convolutional Neural Network. Published in DLMIA/ML-CDS@MICCAI 2017.

Ashburner. A fast diffeomorphic image registration algorithm. Neuroimage 38 (2007), 95-113.

Andersson, et al. How to correct susceptibility distortions in spin-echo echo-planar images: application to diffusion tensor imaging. Neuroimage 20 (2003), 870-888.

* cited by examiner

Fig. 8e  Fig. 8f

UN-SUPERVISED CONVOLUTIONAL NEURAL NETWORK FOR DISTORTION MAP ESTIMATION AND CORRECTION IN MRI

CROSS-REFERENCE TO RELATED APPLICATIONS

This application claims priority from U.S. Provisional Patent Application 62/696,235 filed Jul. 10, 2018, which is incorporated herein by reference.

STATEMENT REGARDING FEDERALLY SPONSORED RESEARCH OR DEVELOPMENT

None.

FIELD OF THE INVENTION

The present invention relates generally to magnetic resonance imaging. More specifically, it relates to techniques for geometric distortion correction of echo planar image data.

BACKGROUND OF THE INVENTION

In echo planar imaging (EPI), geometric distortions are deviations from rectilinear mapping caused by a combination of local off-resonances, i.e., shim imperfections combined with the relatively low readout bandwidth of an EPI train along the phase encode direction which results in a spatial shift of the reconstructed voxel along that direction. Geometric distortions can lead to errors when registering functional or diffusion-weighted imaging data to an undistorted anatomical scan and limit the applications of EPI (Mansfield, 1977) since they generally require some sort of correction (Jezzard, 2012).

State-of-the-art EPI post-processing software packages typically provide some sort of distortion correction functionality. The widely used topup method (Andersson et al., 2003) is based on the observation that by inverting the phase encoding direction, the direction of the distortions is also inverted. Regions stretched in one direction will be compressed in the other and vice versa. This blip up/down approach estimates the underlying distortion field from a pair of images with inverted phase encoding direction. Employing a series of optimizations with descending spatial resolutions, the method iteratively finds the distortion map that best maps both images onto each other. Processing time and user dependent optimization parameters are the main drawbacks of iterative approaches. More details on the blip up/down approach can be found in (Bowtell et al., 1994; Chang and Fitzpatrick, 1992; Holland et al., 2010; Irfanoglu et al., 2015; Morgan et al., 2004). The main limitation of iterative methods is processing speed. The speed is especially critical if a blip up/down pattern were to be played out for every diffusion direction as required for the joint blip up/down reconstruction suggested in (Zahneisen et al., 2017).

BRIEF SUMMARY OF THE INVENTION

The present invention provides a method for estimating a distortion map for EPI distortion correction that is an order of magnitude faster than state of the art iterative methods. This approach reduces the processing time to a few seconds per volume, which is significantly faster than iterative approaches like FSL's topup which takes around to min on the same machine. This approach results in a correction accuracy that is virtually identical to the optimum found by an iterative search, but with significantly reduced computational time. This facilitates the use of a blip up/down scheme for all diffusion-weighted acquisitions and potential real-time EPI distortion correction without sacrificing accuracy.

Embodiments of the present invention achieve these dramatic speed improvements using a deep convolutional neural net (CNN) to perform a feed-forward estimation (inference) of the distortion map from an input pair of blip up and down images, i.e., a pair of images with inverted phase encoding direction. The CNN architecture has an encoder section with decreasing feature map size, followed by a decoder section with increasing feature map size. Information flow from low resolution distortion maps is used to ensure consistency across various resolutions. In preferred embodiments, the CNN architecture is fully convolutional, which means that it learns a set of parameters for 2d convolutions. However, the actual unwarping of the images is implemented as 1d cubic interpolation with density weighting. The density weighting accounts for signal pile-up that takes place during the network's training phase. More specifically, the density of the distorted grid (distortion map), relative to the regular undistorted grid, is estimated for each grid point by counting the contributions of neighboring points weighted by a linear distance metric. In preferred embodiments, the warped imaged is multiplied by the inverse density prior to unwarping. During training, the CNN learns how to infer the distortion map from two input images. In practice, the actual correction, i.e., applying the inverse distortion map, is not performed by the network. However, for the network to be able to learn to provide a reasonably close estimation of the true distortion, the density weighing is included.

The CNN is preferably trained on a wide variety of different diffusion weighted to spin echo EPI protocols. Instead of training the CNN using ground truth distortion maps, the CNN is trained to minimize a similarity metric (loss function) between corrected up and down images. This approach allows the CNN to be trained without the need for a ground truth distortion map, which is difficult to get for real life data, or may not be guaranteed to represent a "true" ground truth.

The output of typical software packages that perform the distortion map estimation depends on a set of parameters like regularization, number of iterations, sub-sampling, etc. that all affect the resulting distortion map. In contrast, the present approach uses minor total variation regularization to guide the network towards smoother distortion maps.

In one aspect, the invention provides a method for magnetic resonance imaging (MRI) comprising: performing by an MRI apparatus an echo planar imaging acquisition using inverted up/down phase encoding directions and reconstructing acquired images having geometric distortions along the phase encoding directions due to off-resonant spins; feed-forward estimating by a convolutional neural network (CNN) a phase distortion map from the acquired images; wherein the CNN has a U-net architecture and is trained to minimize a similarity metric between un-warped up/down image pairs; performing geometric distortion correction of the acquired images using the phase distortion map to unwarp the acquired images. The U-net architecture of the CNN has an encoder section with encoder convolution layers having decreasing feature map dimensions, followed by a decoder section with decoder transposed convolution layers having increasing feature map dimensions. The decoder transposed convolution layers receive information flow from encoder convolution layers of corresponding dimensions, wherein the information flow comprises feature maps. At least one of the decoder transposed convolution layers receives an up-sampled distortion map estimated from a previous layer. Performing geometric distortion correction of the acquired images may be implemented by unwarping the acquired images by 1d cubic interpolation along a phase encoding direction with density weighting to account for signal pile-up that takes place during training of the CCN. The density weighting may be estimated by counting contributions of neighboring points weighted by a linear distance metric.

DETAILED DESCRIPTION OF THE INVENTION

Figure 1:
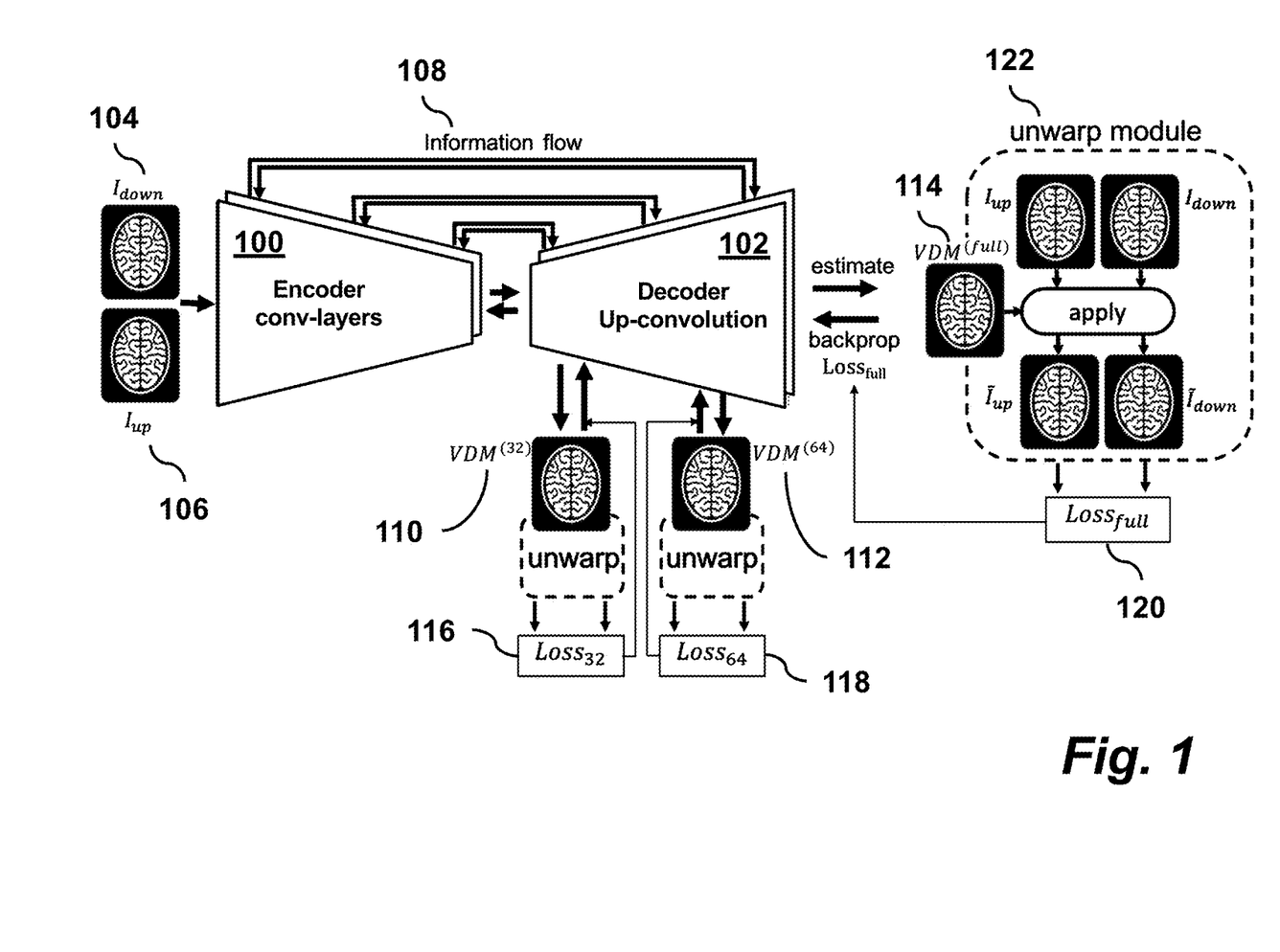
FIG. 1 shows a processing pipeline and associated network architecture illustrating a method of distortion map estimation according to an embodiment of the invention.

FIG. 1 shows a processing pipeline and associated network architecture illustrating a method of distortion map estimation according to an embodiment of the invention. An unsupervised deep convolutional neural net has a U-Net (Ronneberger et al., 2015) architecture with an encoder section 100 and a decoder section 102. The input to the encoder 100 is an up/down image pair 104, 106 denoted $I_{up}$ and $I_{down}$ and represented as a $N_x \times N_y \times 2$ tensor. The input images $I_{up}$ and $I_{down}$ are down-sampled to a 64×64 and to a 32×32 grid as a pre-processing step. Then the full resolution up/down pair is propagated through the encoder network 100 with a series of convolution layers with decreasing feature map dimensions. As the feature map dimension is decreased, the number of channels is increased between layers resulting in an 8×8 map with $N_c=256$ channels.

The final feature map (8×8×$N_c$) of the encoder 100 is fed into a decoder 102 network where the full image resolution is gradually restored by means of up-convolutions. At three distinct spatial resolutions a voxel distortion map (VDM) is estimated, these maps 110, 112, 114 are denoted by $VDM^{(32)}$, $VDM^{(64)}$, $VDM^{(full)}$. The VDM estimation receives information from the decoder layers 102 and also receives information 108 from encoder layers 100 with the corresponding resolution. Each estimated VDM is used to unwarp the input images by an unwarp module 122 and calculate a loss function. These loss functions 116, 118, 120 are denoted $Loss_{32}$, $Loss_{64}$, $Loss_{full}$, and are based on the mean squared difference (MSE) of the corrected up/down pair. Because the unwarp operation is implemented in TensorFlow, it is straightforward to backpropagate the loss into the encoder/decoder network and update its parameters. By minimizing the loss of the unwarp operation during the training phase, no ground truth VDM is required.

Each convolutional layer has a convolution operation (3×3 kernels for all layers), batch normalization of the output, and a leaky ReLu (Maas et al., 2013) activation function. The decrease in feature map size between the main layers is achieved by using a stride s=2 for the convolution operation (Springenberg et al., 2014). The encoder section has $N_{enc}=4$ layers and results in an 8×8×256 feature map that serves as the input to the decoder section.

Figure 2:
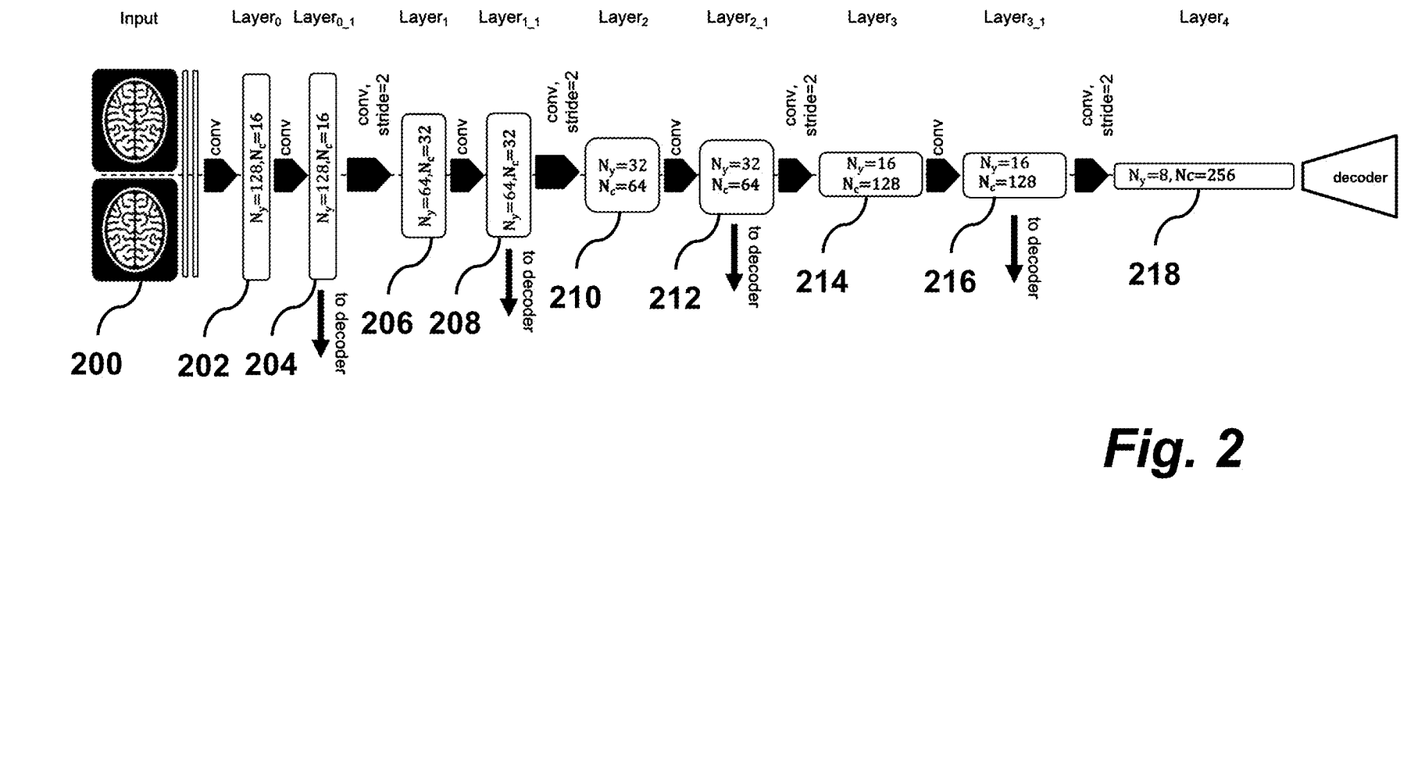
FIG. 2 illustrates the detailed structure of the encoder section of the network of FIG. 1 according to an embodiment of the invention.

FIG. 2 illustrates the structure of the encoder section of the network. The up/down input pair ($N_x \times N_y \times 2$) 200 is fed into the first convolution layer 202 with $N_c=16$ filters and 5×5 kernel size followed by a leaky ReLu activation function and a batch normalization operation. The $N_x$ direction of the feature map is omitted in the graph. A $2^{nd}$ convolution layer 204 with identical parameters is applied and stored and sent to the decoder section. The reduction in feature map size from layer 202 to layer 204 is achieved by using a stride s=2 for the convolution operation. All following encoder convolutions 206, 208, 210, 212, 214, 216, 218 have a 3×3 filter kernel. These operations are repeated until the final feature map (dimensions 8×8 by $N_c=128$) is fed into the decoder network.

Figure 3:
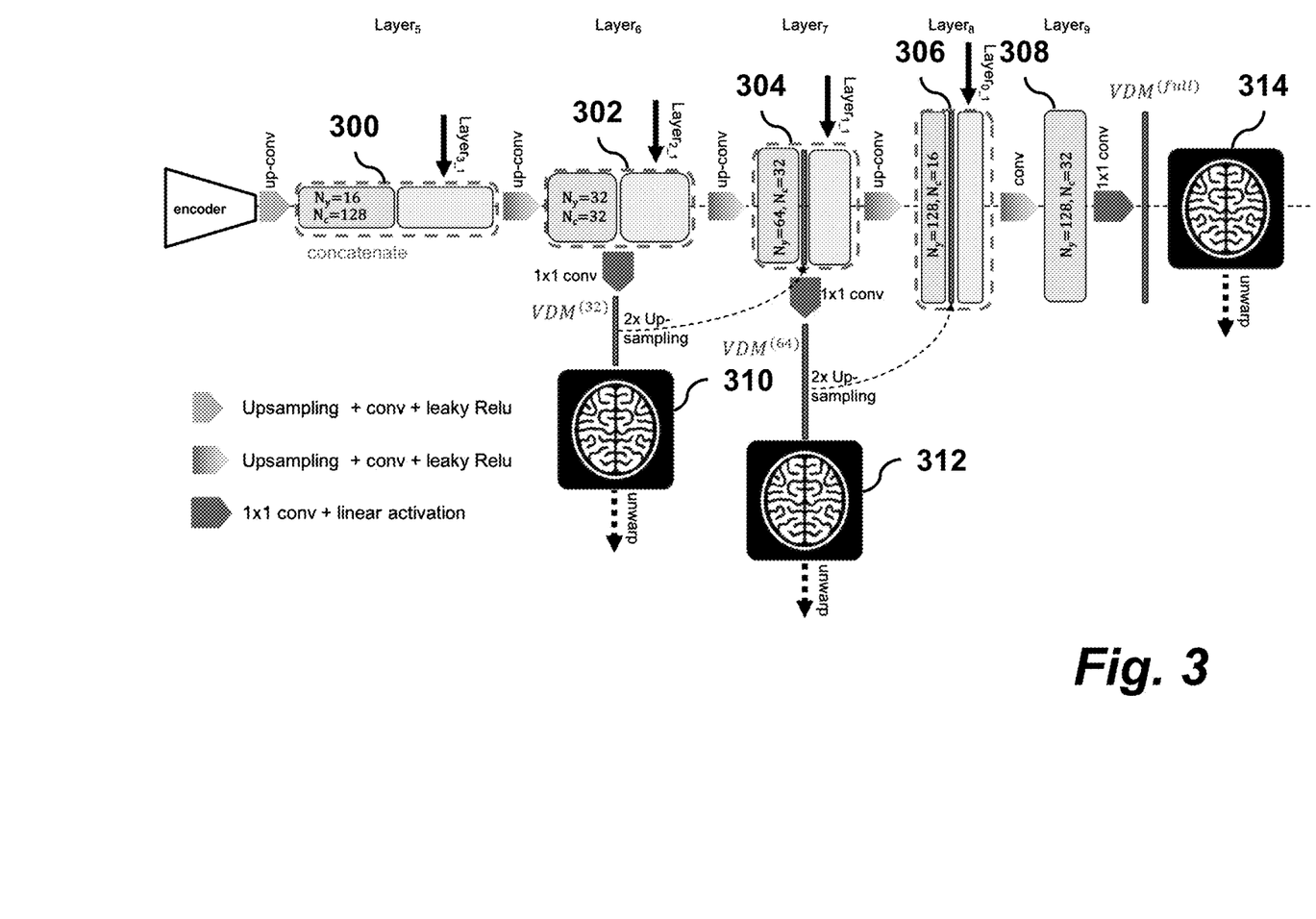
FIG. 3 illustrates the detailed structure of the decoder section of the network of FIG. 1 according to an embodiment of the invention.

FIG. 3 illustrates the structure of the decoder section of the network. The purpose of the decoder section is to generate feature maps at various resolution stages that allow the calculation of distortion maps by means of 1×1 convolution operations. The decoder section has $N_{dec}=5$ main layers 300, 302, 304, 306, 308 where the feature map size is gradually increased by means of an up-convolution operation, also known as transposed convolution. Up-convolution steps refers to the process of up-sampling followed by a convolution (5×5 kernels for all layers) and an activation function. The up-sampling is performed by mapping (replicating) each feature map entry to a 2×2 nearest neighborhood.

Each layer in the decoder receives input from an up-sampled version of the previous layer, the feature map from the encoder with corresponding resolution and, if available for Layer 304 and 306, an up-sampled version of the distortion map 310, 312 that was estimated at the previous stage. The VDMs, together with up/down input data, are sent to the unwarp module where they are used to correct the input. The mean squared error (MSE) of the corrected input is sent back to update the weights in the network (using TensorFlow's backpropagation). The final output of our network is a voxel distortion map (VDM) 314 that describes the spatial displacement (in pixel units) of each voxel of the input images along the y-direction, i.e., the phase encoding direction.

In order to facilitate information flow through the network from lower resolutions and earlier layers of the encoder section we concatenate the resulting feature map of each up-convolution with an up-sampled version of the previous VDM and one layer of the encoder section with corresponding feature map dimensions. This ensures that at each resolution the estimation of the new VDM is informed by the information of a low-resolution version and thus is able to be self-consistent across multiple resolutions. From a pure neural network perspective these shortcuts between earlier and later parts of a deep network reduce the problem of vanishing gradients (Hochreiter and Frasconi, 2009) and lead to a better convergence.

We estimate voxel distortion maps (VDM) at three distinct spatial resolutions (32×32, 64×64, 128×128) and apply them to the input up/down pair with the corresponding resolution (see un-warp module). In this context, spatial resolution refers to the grid size of our image and not to the actual voxel size in physical units.

The Unwarp Module

To make full use of the internal gradient calculations and backpropagation of the loss, an unwarp module (122, FIG. 1) is implemented in TensorFlow. It receives the distorted up/down pair and the estimated VDM as input with arbitrary resolution and applies (un-warps) the input with the distortion map. The unwarping of the distorted input images is performed by 1d-cubic interpolation along the phase encode direction. We also account for density variations of the transformed voxel position grid. That means that the intensity of a voxel that experienced signal pile up from multiple voxels in the distorted case is reduced accordingly prior to the actual unwarping. While the density compensation is not able to restore the information of the individual contributions to the signal pile up, it preserves the total image intensity for the unwarped case. For each resolution the un-warped images are returned as tensors which are then fed into the custom mean squared error loss function described below.

The input to the unwarp module has an $(N_x \times N_y) \times 1$ vector IM of linearized image intensities and a vector vdm with equal dimensions that holds the voxel displacements (in pixel units). A grid vector $y_{grid}$ of undistorted y-pixel-coordinates is constructed as an array of increasing indices $[0,1,2, \ldots, N_x*N_y-1]$ since only the y-coordinate is of importance for the distortion correction. This kind indexing facilitates vector operations but ignores circular permutations that can be present in an MRI scan, i.e., the image re-appearing on the left when shifted past the right edge.

For the transformation the inverse mapping u', i.e., the pixel shift values that maps a distorted pixel back to the undistorted grid, is calculated as u'=y−vdm. u' contains fractional pixel shift values and therefore mapping of the image intensities to the un-warped image grid has to be done by interpolation, 1d-cubic in our case. For each new coordinate u' we get the four nearest grid points, $u_g^{(-1)}$, $u_g^{(0)}$, $u_g^{(+1)}$, $u_g^{(+2)}$ by $$u_g^{(0)} = \text{floor}(u')$$

$$u_g^{(-1)} = u'_g{}^{(0)} - 1$$

$$u_g^{(+1)} = u'_g{}^{(0)} + 1$$

$$u_g^{(-2)} = u'_g{}^{(0)} + 2$$

where floor(x) stands for the floor operation.

$\Delta y$ is the defined as the distance between u' and the grid point on the left $u_g^{(0)}$ as $\Delta y = u' - u_g^{(0)}$. Cubic interpolation can be split into 4 terms where IM(x) refers to image intensity at position x:

$$cub = \left(-\frac{1}{2}*IM(u_g^{(-1)}) + \frac{3}{2}*IM(u_g^{(0)}) - \frac{3}{2}*IM(u_g^{(+1)}) + \frac{1}{2}*IM(u_g^{(+2)})\right)*\Delta y^3$$

$$quad = \left(IM(u_g^{(-1)}) - \frac{5}{2}*IM(u_g^{(0)}) + 2*IM(u_g^{(+1)}) - \frac{1}{2}*IM(u_g^{(+2)})\right)*\Delta y^2$$

$$lin = \left(-\frac{1}{2}*IM(u_g^{(-1)}) + \frac{1}{2}*IM(u_g^{(+1)})\right)*\Delta y$$

$$z0 = IM(u_g^{(0)})$$

and finally combining all four terms for all grid points leads to the unwarped image:

$$IM_{unwarp} = cub + quad + lin + z0$$

Density Compensation

The sampling density is estimated by a smoothed linear interpolation of the grid point density. At each grid point $g_i$ the contributions from neighbors on the left $$w_i^{left} = \Sigma_{n\, s.t.\, u_g^{(-1)} = i}(1 - \Delta y_{(n)})$$

and on the right $$w_i^{right} = \Sigma_{n\, s.t.\, u_g^{(0)} = i}(\Delta y_{(n)})$$

are calculated separately and summed up for the final value $w_i = w_i^{left} + w_i^{right}$. An additional step performs smoothing of the density function with a gaussian kernel to remove high frequent oscillations. Prior to the unwarping, the uncorrected image is multiplied by the inverse sampling density which effectively reduces the intensity in regions with signal pile up and increases the intensity in regions with lower density. FIG. 4f illustrates the density estimation for a given grid point.

Figure 4A:
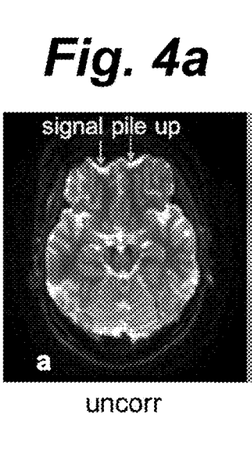
FIG. 4a-FIG. 4e are images that show the effect of the density correction on the corrected images according to an embodiment of the invention.
Figure 4B:
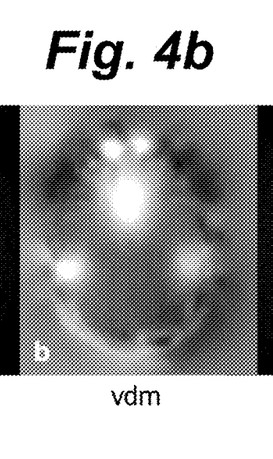
Figure 4C:
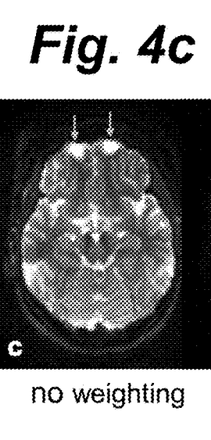
Figure 4D:
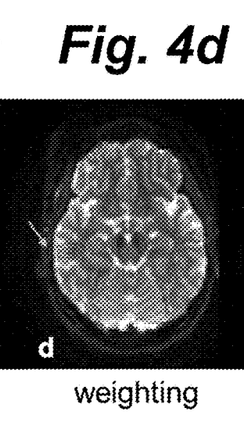
Figure 4E:
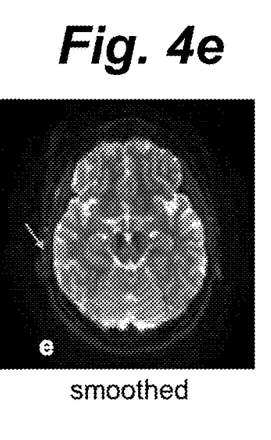
Figure 4F:
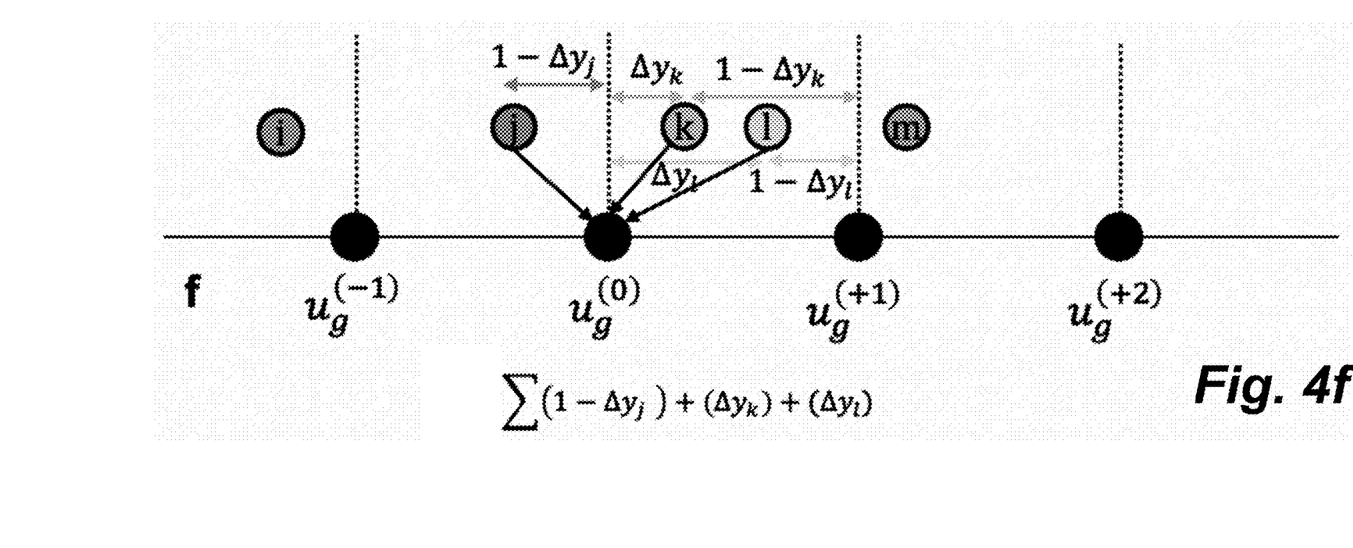
FIG. 4f illustrates the density estimation for a given grid point according to an embodiment of the invention.

The effect of the density correction on the corrected images is shown in FIG. 4a-FIG. 4e. Uncorrected, the signal pile up in the input data leads to bright blobs in the frontal region of the brain for the unwarped images. FIG. 4a shows an uncorrected image with signal pile up (vertical arrows) in orbito-frontal part of the brain and the corresponding distortion map in FIG. 4b. Without density compensation (FIG. 4c) the artificially high signal intensity gets distributed to all voxels that contributed to the signal pile up resulting in two bright blobs. With density compensation, the image in FIG. 4d appears normal although the spatial resolution is lost in this particular region of the image. A residual ripple artifact can be observed (arrow) in FIG. 4d which is due to high frequency oscillations in the density function. Simple smoothing with a gaussian kernel greatly reduces this artifact. The unwarped images with smoothed density weighting function are shown in FIG. 4e.

We implemented the unwarp module as tensor operations in tensorflow using the tf.gather( ), tf.pow( ) and tf.unsorted_segment_sum( ) functions. tf.gather(input_array,indices) returns the values of input_array and positions given by indices and corresponds to the IM(x) operation. tf.unsorted_segment_sum(input_array,indices) works in a similar way but instead returns the sum of the input_array for all equal values in the indices array. This function is an efficient way to calculate $w_i^{right}$ and $w_i^{left}$ for the entire array of grid points.

Loss Function and Regularization

The training of the network is not to minimize the difference between the predicted distortion map and a ground truth map. Instead the approach is to minimize the mean squared difference of the un-warped images. Specifically, the aim during training of the network is to minimize a combined loss function, which is the mean squared errors (MSE) between the corrected up/down images $\tilde{I}_{down}^{(N)}$ for each internal resolution stage n:

$$L_{MSE}^{(n)} = \frac{1}{N}\sum \|(\tilde{I}_{down}^{(n)} - \tilde{I}_{up}^{(n)})\|^2$$

where the sum is over all pixels in the image. This choice of the loss function minimizes the difference between corrected up/down images which, in the absence of noise and other MR imperfections, should approach zero for an ideal correction where the up-image is perfectly mapped onto the down-image. The squared error also puts more weight on greater differences and thereby puts more emphasis on the edges of an uncorrected image which are the regions where we expect the strongest pixel shifts.

Since the distortion map ultimately comes from a physical magnetic field variation with its boundary conditions governed by the Maxwell equations, it is reasonable to assume a certain smoothness of the distortion map. We therefore add the anisotropic total variation (TV) norm of each predicted VDM as a smoothness penalty to the total loss function:

$$L_{TV}^{(n)} = TV(VDM^{(n)}) = \Sigma_{i,j} |VDM_{i+1,j}^{(n)} - VDM_{i,j}^{(n)}| + |VDM_{i,j+1}^{(n)} - VDM_{i,j}^{(n)}|,$$

where i,j are the pixel indices.

We add an additional penalty term to restrict the values that can occur in the distortion maps to reasonable values:

$$L_{valley}^{(n)} = \Sigma \min(|VDM^{(n)}| - vdm_{max}, 0)$$

where the sum is over all pixels in the image. This valley shaped loss function only penalizes values above a certain threshold. We use a maximum displacement $vdm_{max}=32$ pixels for the full resolution and scale it down for lower resolutions accordingly. The valley loss function only plays a role during the early training phase. Our resampling implementation does not account for a circular permutation of the image, i.e., the image re-appears on the other side if shifted outside the FOV. Instead we simply cut off the part that gets shifted too far out. The valley loss penalizes trivial solutions with extremely large shifts resulting in corrected images that only consist of zeros and therefore have minimal MSE. During later stages of the optimization process the valley loss contribution is always zero and, in theory, could be turned off.

The total loss $L_{total}$ then has the form:

$$L_{total} = \Sigma_{n=[32;64;128]} L_{MSE}^{(n)} + \lambda(L_{TV}^{(n)} + 10^3 L_{valley}^{(n)})$$

where $\lambda$ is the regularization parameter for the smoothness penalty.

Training and Test Data—Image Acquisition Protocols

For a network to be able to generalize well it is important that the training data covers a wide range of potential image properties or characteristics. We therefore chose to train our network on wide variety of acquisition parameters. All images were acquired using a diffusion-weighted (DW) spin-echo EPI sequence at 3T. Images were acquired using a custom-built DW simultaneous multi-slice (SMS) spin-echo EPI sequence and with a vendor provided sequence without multi-band support. Various combinations of in-plane $R_y=[1,2]$ and multi-band acceleration $R_{sms}=[1-4]$ were included in the training data. The acquired in-plane voxel sizes ranged between 1.3 and 2.4 mm, slice thickness between 1.7-2.2 mm, and echo time (TE) between 65-105 ms. The network operates in the image domain, and therefore specific MR acquisition parameters are not relevant for the calculation of the voxel distortion maps. They become relevant if one wants to transform the VDM into an off-resonance map with actual values in Hz.

In one example, a total of $N_{subjects}=20$ subjects was split into $N_{train}=13$ training cases (healthy subjects) and $N_{test}=7$ test cases. Three datasets were acquired with blip up/down for all diffusion directions and included for data augmentation purposes. Because the distortions are expected to be very similar for all diffusion directions (ignoring the effects of motion and eddy currents), we only included 3 additional diffusion weighted volumes per subject in the training data. The test dataset in this example exclusively consisted of $b_0$ volumes.

Each acquired volume was resampled from the original matrix size to a 128×128 grid and then each slice was treated as a separate input to the network resulting in $N_{tot}=4428$ slices, i.e., the total number of training examples extracted from all available datasets. Although every up/down pair of images is treated as a separate input to the network, the split between training and test cases was performed on a subject level because of the expected strong correlations between neighboring slices within individual subjects that would alter the validity of the test measurements, as it would overestimate how well the network would generalize to unseen test cases.

Data augmentation was used to increase the available number of training examples. From every original subject, we generated two new synthetic datasets by a) flipping (mirroring) along the readout direction and b) interchanging which image is considered blip up and which down. Since the goal of the network is to generalize from the training dataset to whatever unseen test case it receives, the training dataset should span the space of potential datasets. Both augmentations achieve that without altering the underlying physical process of the distortions. In contrast, data augmentation by rotating or scaling the input images would alter the specific restriction that distortions only occur along the well-defined phase encoding direction and the transformed images would no longer be consistent with the change in the underlying susceptibility field due to these transformations.

As a pre-processing step, the mean intensity of all input image data was normalized to 1 with unchanged standard deviation and resampled to the three different resolutions used in the network by bi-linear interpolation. Prior to the down-sampling step for the n=64 and n=32 matrix dimensions, the up/down images were filtered with a Gaussian smoothing kernel (kernel size 3×3, sd=1.2 for n=64 and sd=2 for n=32).

Machine Learning Framework

In one example embodiment, the network was implemented used a combination of Python versions of Keras (Chollet, 2015) and TensorFlow to implement and train our network. Stochastic gradient descent was performed using an Adam optimizer (Kingma and Ba, 2014) with the default settings provided by the Keras package. We used batch normalization (Ioffe and Szegedy, 2015) for the layers in the encoder section only, since the decoder layers perform a regression task where the scaling of the output needs to be transmitted. Training was performed with $N_{epochs}=100$ epochs and with a learning rate of lr=0.001 using a batch size of 32. For all training settings, the loss function for both the training and the test loss reached a plateau after around 80-100 epochs and further training did not improve the test performance. We trained our network on a server with an Intel Xeon CPU with 16 available cores for multi-threading without GPU support. We also trained our model using a cloud based virtual machine (Google ML engine) with GPU support (1 Nvidia K80 card). We didn't notice a significant decrease in training time when a GPU was used. In both cases, models typically converged after approximately 48 hrs.

Distortion Map/Distortion Field Estimation Using FSL

We chose to use FSL's blip-up/down correction package (Andersson et al., 2003) as a gold standard for a distortion map estimate because of its robustness and wide use within imaging community. We used FSL 5.0 (Smith et al., 2004) and specifically topup, which uses a method similar to that described in (Andersson et al., 2003), to calculate the distortion field and the distortion map. All corrections relied on settings from the standard configuration file that is part of the software distribution. Topup corrected images were pre-processed with the same pipeline that was used for the network input and the MSE image metric from the conv-net was used to calculate the topup loss for a set of input images.

Results

Figure 5A:
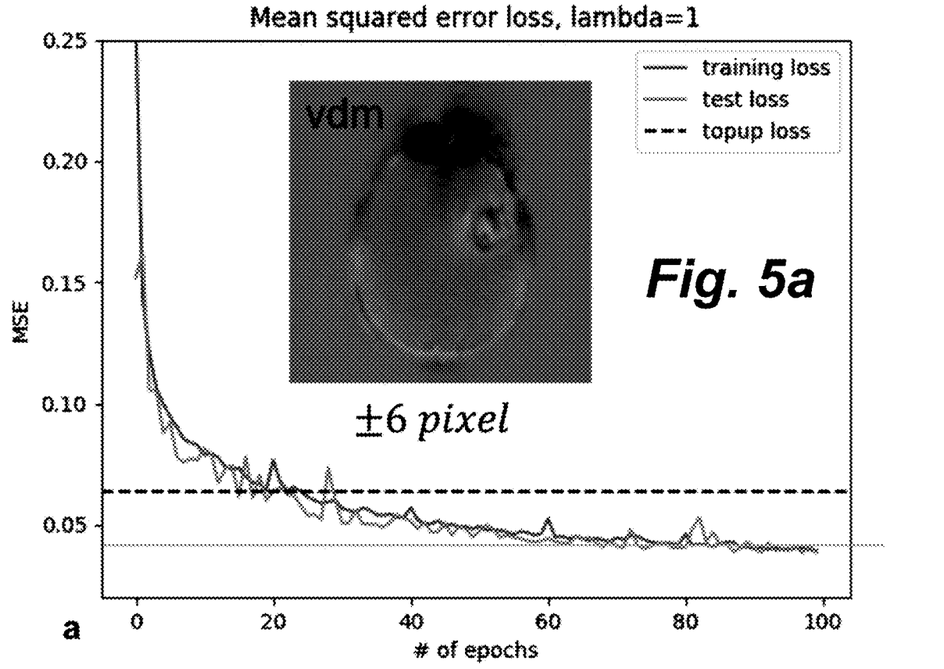
FIG. 5a and FIG. 5b display the evolution of the loss metrics as a function of training iteration for the full resolution output images during the training phase according to an embodiment of the invention.
Figure 5B:
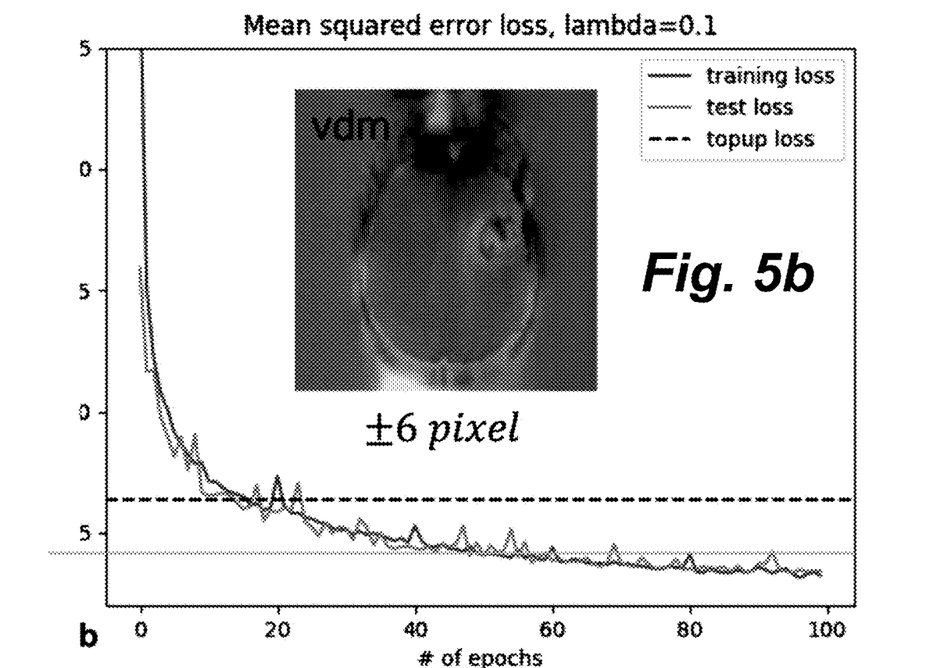

Learning phase and comparison with results from FSL's topup were investigated. FIG. 5 displays the evolution of the loss metrics $L_{MSE}^{(128)}$ as a function of training iteration for the full resolution output images during the training phase. The training loss and the test loss learning curves sharply decrease during the initial training phase and reach a plateau after around too epochs. The horizontal dashed line represents the loss that was calculated from topup corrected up/down images of the test set. After around 20 epochs the network reaches the accuracy of the topup correction and with further training surpasses it by approximately a factor of 2. Two different VDM regularization factors are shown, $\lambda=1$ in FIG. 5a and $\lambda=0.1$ in FIG. 5b. A higher regularization factor leads to smoother VDMs, i.e., distortion maps in FIG. 5a, and results in a slightly higher final training loss. For the lower regularization factor in FIG. 5b the network selects a solution with lower training error at the cost of pronounced regions with erroneous distortion values outside the brain. For a fixed matrix size of 128×128 and 50 slices, topup processing takes approximately to minutes per volume with parallel processing on maximum available number (12) of CPUs, whereas a single network inference takes less than to seconds on the same computer.

Figure 6:
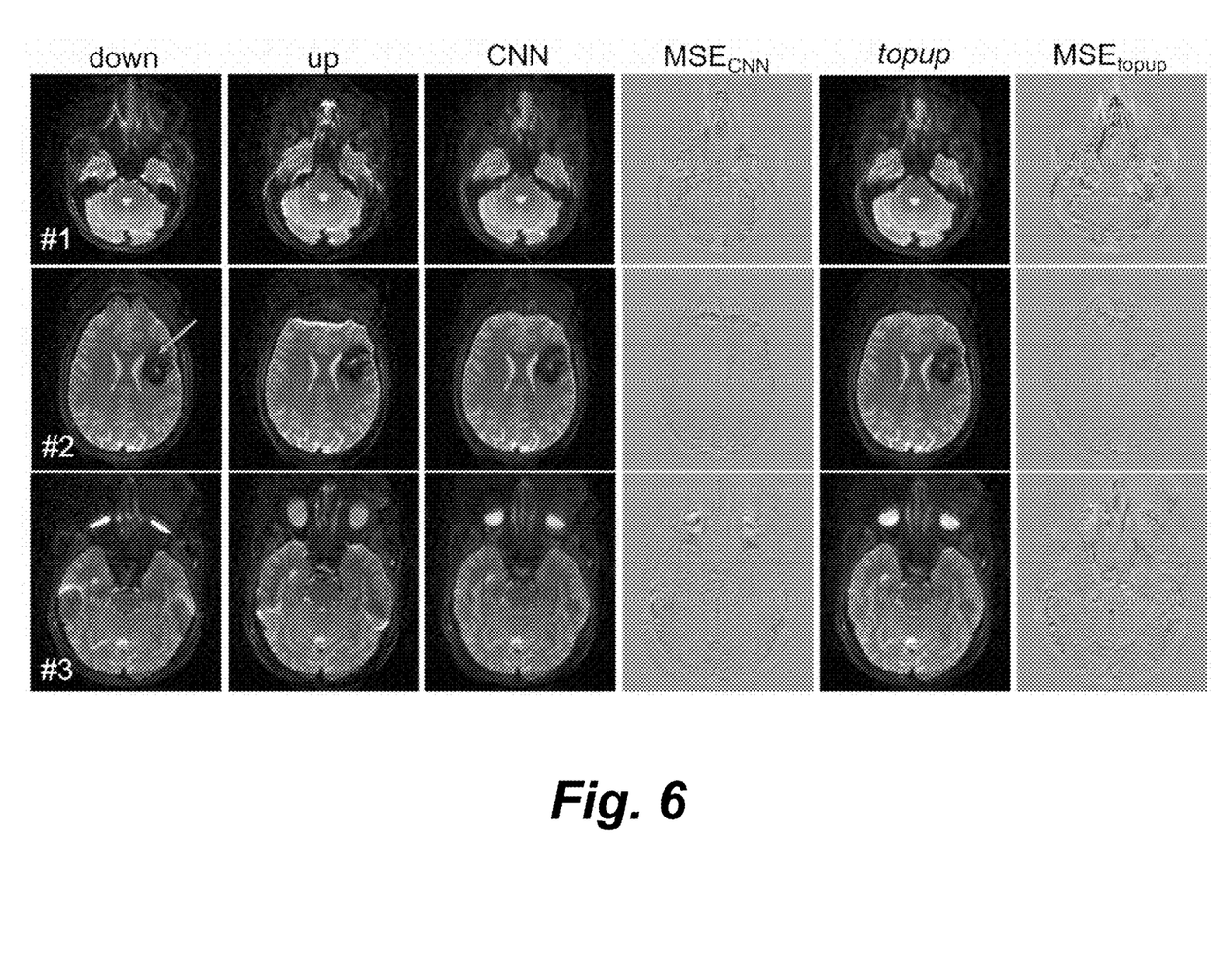
FIG. 6 is an image array showing the results from the distortion correction according to an embodiment of the invention.

Evaluation of correction accuracy was performed. The results from the correction are displayed in FIG. 6 with 3 axial slices from three different subjects (rows) randomly selected from the test dataset. The first and second column show uncorrected blip up and down input images with typical distortions. The next two columns show the results of the correction (corrected up and down averaged together) and the residual difference between the corrected up and down images. The last two columns display the results from the topup corrected images and the respective residual difference. All difference maps were scaled with mean image intensity of the respective image pair and displayed with identical color mapping. We can see that the residual difference is slightly higher for the topup case. The residual differences (and the resulting images) of the network approach appear slightly smoother which might contribute the overall impression that the residual error is smaller for the deep network.

Figure 7A:
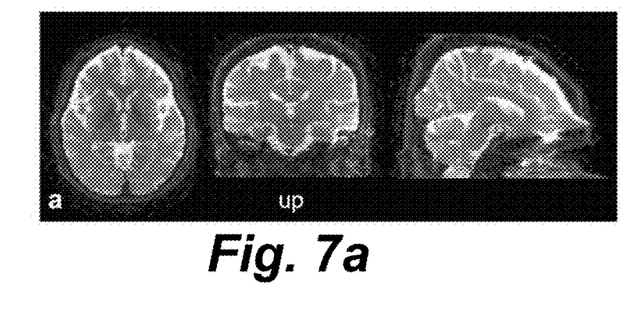
FIGS. 7a-f are images showing results of distortion correction for a single subject diagnosed with essential tremor according to an embodiment of the invention.
Figure 7B:
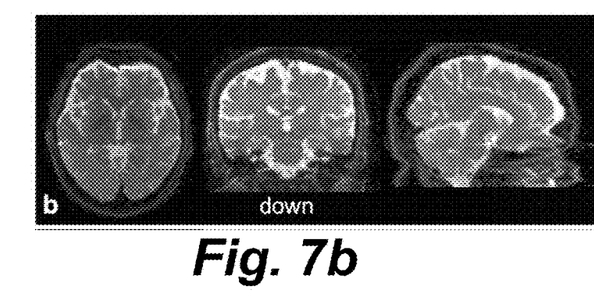
Figure 7C:
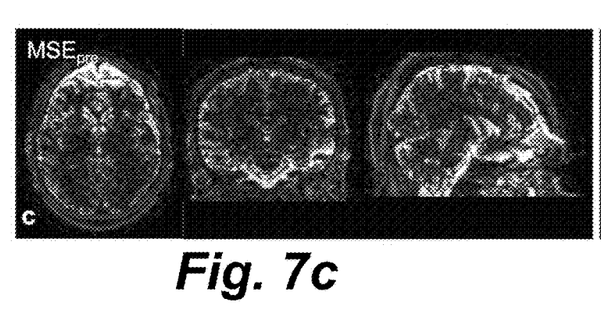
Figure 7D:
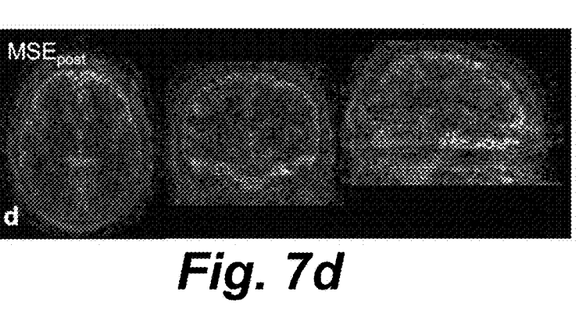
Figure 7E:
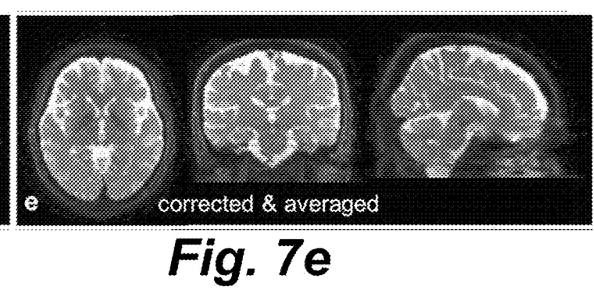

The resulting correction for a single subject diagnosed with essential tremor is displayed in FIGS. 7a-f. The uncorrected up/down volumes are plotted in FIG. 7a and FIG. 7b. The pixel-wise difference between FIG. 7a and FIG. 7b is shown in FIG. 7c. The corrected volume, i.e., the output of the network for up and down averaged, is displayed in FIG. 7e and the difference between corrected up and down (residual error) is displayed in FIG. 7d (same intensity scaling as in FIG. 7c). The residual error in FIG. 7d dramatically reduced compared to FIG. 7c.

Figure 7F:
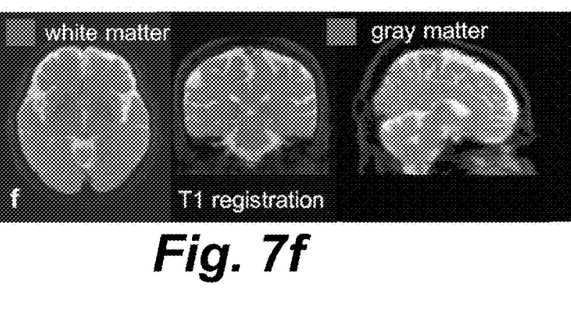

Except for the edges of the brain and some CSF boundaries, residual error appears unstructured and has little resemblance to brain structures, which demonstrates that the correction is close to an optimum. To further validate the correction, the averaged output of the network in FIG. 7e was registered to a structural T1 scan using a global affine transformation with 12 DOF, i.e., rotations, translations and scaling. FIG. 7f shows the T1 segmentation overlaid onto the corrected and registered image, showing that the network produces an undistorted image that can be registered to a structural scan with high accuracy using a single transformation matrix for the entire volume. The overlay highlights the ability of the network to produce an undistorted image.

Figure 8A:
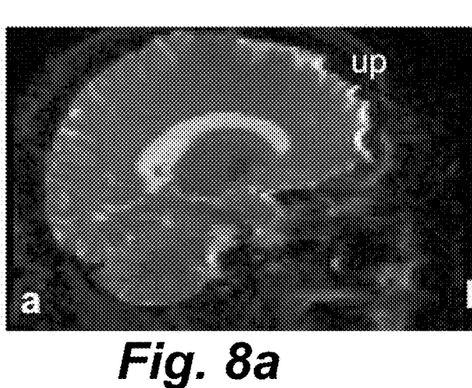
FIGS. 8a-f show results of distortion correction for a subject with ventricular/periventricular GBM according to an embodiment of the invention.
Figure 8B:
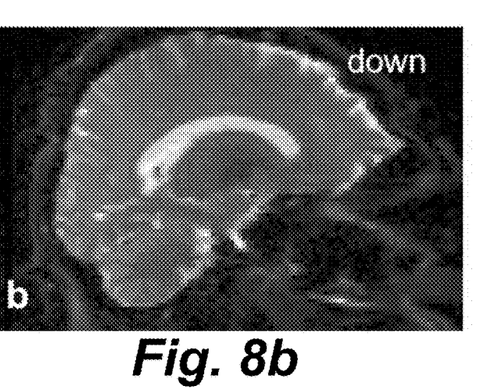
Figure 8C:
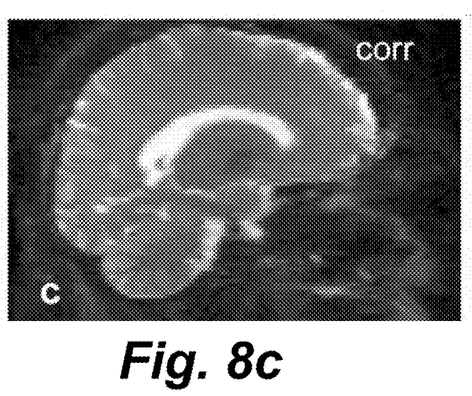
Figure 8D:
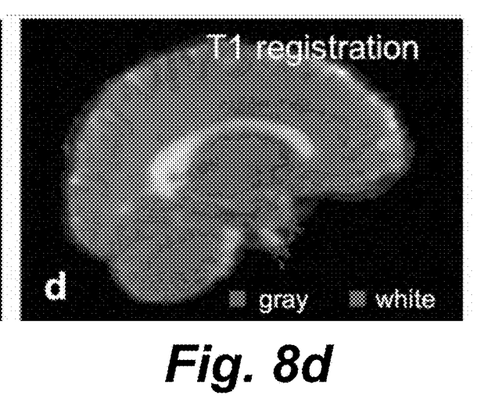
Figure 8E:
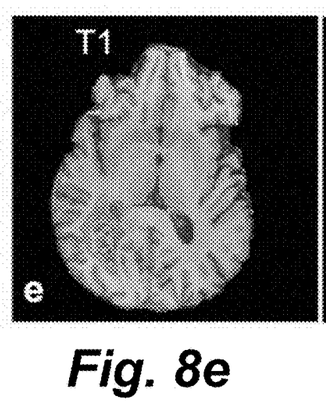
Figure 8F:
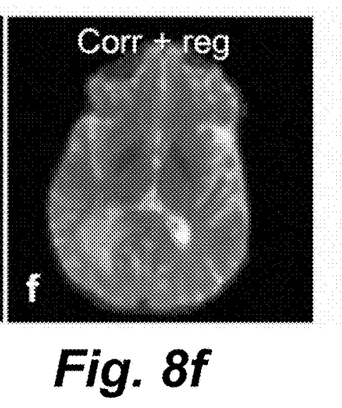

FIGS. 8a-f show results for a subject with ventricular/periventricular GBM. Sagittal slices that depict the uncorrected blip up and down scans are shown in FIG. 8a and FIG. 8b. The corrected and averaged volume is shown in FIG. 8c. In FIG. 8d, the corrected volume was registered to an anatomical T1 scan and the gray/white matter segmentation overlay demonstrates the effectiveness of the distortion correction. In FIG. 8e, an axial T1-weighted image slice with manual segmentation of the left lateral ventricle and the outline of a Glioblastoma multiforme is displayed. In FIG. 8f, the corresponding slice of the corrected and registered DWI volume is shown with the mask copied from FIG. 8e. The outline of the manual segmentation is copied onto the corresponding slice of the corrected and registered DWI volume, showing excellent co-registration.

Discussion

The techniques of the present invention train a deep convolutional network to estimate a distortion map from a pair of blip up/down input images. The learning approach updates the network parameters to minimize a similarity metric between the corrected up/down pair. This approach does not require actual ground truth distortion maps and allows training with a relatively small number of images assuming that they span the expected space of possible distortions. The network architecture in an illustrative embodiment uses a fixed input size of 128×128 which corresponds to 1.7 mm² voxel size for a typical FOV of 220 mm. DWI acquisitions with a different matrix size were re-sampled to a 128×128 grid in a pre-processing step. The estimated distortion maps were then re-sampled as well. Preferably, the training dataset is composed of up/down acquisitions with a wide range of imaging parameters. In an example, 5% of the data were acquired with diffusion weighting (b>o) from healthy subjects. Our test datasets also include pathologies that are unique for each subject and were therefore not seen by the network during the training phase. Tests confirm that the learned mapping of the network is able to generalize to unknown pathologies. From lesion-free brains, the network learns how to handle air-tissue interfaces, regions with varying contrast and signal intensities of arbitrary shape, etc. As long as the encoding time along the multi-band direction is sufficiently short, which is the case for state-of-art blipped-CAIPI-EPI sequence, it is safe to ignore if the up/down images were reconstructed from multi-band data; the dominant effect will still be along the phase encoding direction.

The techniques uses a total variation penalty as a form of regularization of the distortion maps since an infinite number of solutions exist for a given up/down pair. This global penalty enforces that the network learns to produce a smooth distortion map without imposing restrictions how this is achieved. Since the network is convolutional it is conceivable that some of the last layers resemble a smoothing kernel, e.g. Gaussian etc., with locally adaptive filter width. However, regularization does not address the problem that some brain regions are no longer diffeomorphic, i.e., distorted voxels can cross each other in case of strong dephasing gradients. Additionally, strong dephasing gradients through a voxel result in signal loss that violates the assumption that the total signal intensity is preserved between up and down encoding. Embodiments therefore may ignore these cases.

Comparison to Existing Methods

The de facto standard to calculate a distortion map from an up/down pair is an iterative multi-resolution method to minimize a difference metric between input pairs. We chose to compare our approach to the widely used topup method (Ashburner, 2007) with default parameters. For a large set of subjects, our approach is able to learn from a wide variety of different images and therefore able to generalize to unseen cases. The main advantage of our approach is processing speed since the distortion map is calculated by a single forward-pass through the network with shared information between resolution stages instead of an iterative series of resampling and update operations. In addition, our network learned to correct images from an internal feedback loop and does not rely on ground truth data provided by a another method.

The network described herein supports a fixed input size. Thus, images with different resolutions can be re-sampled to match that 128×128 grid. Because of the smooth nature of a typical distortion map, this works well for voxel dimensions between 1.2 and 2.5 mm². For spatial dimensions that differ considerably from the training dataset, a new model can be trained or the existing architecture can be modified so that it is able to adapt to different input dimensions. For other applications with different image properties, e.g. pediatric imaging or body imaging, the weights can be re-trained on a suitable dataset. It is envisioned that it may be possible to use the same approach for fMRI with GRE-EPI up/down images where signal intensity is lost in regions with a strong dephasing off-resonance gradient.

The embodiments described herein are implemented in 2d with each slice of a volume treated as an independent training example. If the slice direction of a DWI acquisition is sampled sufficiently dense, we envision using 3d convolutions that would allow the network to exploit correlations and minimize TV along the slice direction due to the smoothness of the distortion field. It would also be possible to include a spatial transformer module to account for head motion between the up and down acquisition like shifts and other affine transformations. The output of the network would then not be a distortion map with one scalar per voxel but three orthogonal distortion components for each voxel, i.e., x, y, z. The more complex output might require extra layers to increase the network capacity and additional training data to prevent over-fitting. The 1d cubic interpolation would be replaced in this case with a bi-linear/cubic interpolation to allow for shifts and distortion in arbitrary directions.

We also envision that the network can successfully correct eddy current induced distortions if a blip up/down pattern is played out for every diffusion direction. The expectation is that the distortion corrected dataset is inherently eddy current corrected since each VDM contains dynamically changing contributions to the effective off-resonance map like eddy currents or changes due to breathing.

REFERENCES

Andersson, J. L. R., Skare, S., Ashburner, J., 2003. How to correct susceptibility distortions in spin-echo echo-planar images: application to diffusion tensor imaging. Neuroimage 20, 870-888. doi:10.1016/S1053-8119(03)00336-7

Ashburner, J., 2007. A fast diffeomorphic image registration algorithm. Neuroimage 38, 95-113. doi:10.1016/j.neuroimage.2007.077.007

Bowtell, R. W., McIntyre, D. J., Commandre, M.-J., Glover, P. M., 1994. Correction of geometric distortion in echo planar images. Proc. 2nd Meet. Soc. Magn. Reson. 411.

Chang, H., Fitzpatrick, J., 1992. A technique for accurate magnetic resonance imaging in the presence of field inhomogeneitiesitle. IEEE Trans Med Imaging 11, 319-29.

Chollet, F., 2015. Keras [WWW Document]. Keras. URL https://keras.io de Vos, B. D., Berendsen, F. F., Viergever, M. A., Staring, M., Išgum, I., 2017. End-to-End Unsupervised Deformable Image Registration with a Convolutional Neural Network. doi:10.1007/978-3-319-67558-9_24

Dosovitskiy, A., Springenberg, J. T., Tatarchenko, M., Brox, T., 2017. Learning to Generate Chairs, Tables and Cars with Convolutional Networks. IEEE Trans. Pattern Anal. Mach. Intell. 39, 692-705. doi:10.1109/TPAMI.2016.2567384

Fischer, P., Dosovitskiy, A., Ilg, E., . . . , Brox, T., 2015. FlowNet: Learning Optical Flow with Convolutional Networks. Iccv 8. doi:10.1109/ICCV.2015.316

Hochreiter, S., Frasconi, P., 2009. Gradient Flow in Recurrent Nets: The Difficulty of Learning LongTerm Dependencies. A F. Guid. to Dyn. Recurr. Networks. doi:10.1109/9780470544037.ch14

Holland, D., Kuperman, J. M., Dale, A. M., 2010. Efficient correction of inhomogeneous static magnetic field-induced distortion in Echo Planar Imaging. Neuroimage 50, 175-83. doi:10.10016/j.neuroimage.2009.11.044

Ioffe, S., Szegedy, C., 2015. Batch Normalization: Accelerating Deep Network Training by Reducing Internal Covariate Shift. doi:10.1007/s13398-014-0173-7.2

Irfanoglu, M., Modi, P., Nayak, A., Hutchinson, E., Sarlls, J., Pierpaoli, C., 2015. DR-BUDDI (Diffeomorphic Registration for Blip-Up blip-Down Diffusion Imaging) Method for Correcting Echo Planar Imaging Distortions. Neuroimage 106, 284-299.

Jezzard, P., 2012. Correction of geometric distortion in fMRI data. Neuroimage 62, 648-651. doi:10.1016/j.neuroimage.2011.09.010

Kingma, D. P., Ba, J., 2014. Adam: A Method for Stochastic Optimization 1-15. doi:http://doi.acm.org.ezproxy.lib.ucf.edu/io.1145/1830483.1830503

Maas, A. L, Hannun, A. Y., Ng, A. Y., 2013. Rectifier Nonlinearities Improve Neural Network Acoustic Models. Proc. 30 th Int. Conf. Mach. Learn. 28, 6.

Mansfield, P., 1977. Multi-planar image formation using NMR spin echoes. J. Phys. C Solid State Phys. 10, 55-58.

Morgan, P. S., Bowtell, R. W., Mcintyre, D. J. O., Worthington, B. S., 2004. Correction of Spatial Distortion in EPI Due to Inhomogeneous Static Magnetic Fields Using the Reversed Gradient Method 507, 499-507. doi:10.1002/jmri.20032

Ronneberger, O., Fischer, P., Brox, T., 2015. U-Net: Convolutional Networks for Biomedical Image Segmentation 1-8. doi:10.10007/978-3-319-24574-4_28

Shan, S., Guo, X., Yan, W., Chang, E. I.-C., Fan, Y., Xu, Y., 2017. Unsupervised End-to-end Learning for Deformable Medical Image Registration 14, 1-12.

Smith, S. M., Jenkinson, M., Woolrich, M. W., Beckmann, C. F., Behrens, T. E., Johansen-Berg, H., Bannister, P. R., De Luca, M., Drobnjak, I., Flitney, D. E., Niazy, R. K., Saunders, J., Vickers, J., Zhang, Y., De Stefano, N., Brady, J. M., Matthews, P. M., 2004. Advances in functional and structural MR image analysis and implementation as FSL Neuroimage 23 Suppl 1, S208-19. doi:10.1016/j.neuroimage.2004.07.051

Springenberg, J. T., Dosovitskiy, A., Brox, T., Riedmiller, M., 2014. Striving for Simplicity: The All Convolutional Net 1-14. doi:10.163/_q3_SIM_00374

Zahneisen, B., Aksoy, M., Maclaren, J., Wuerslin, C., Bammer, R., 2017. Extended hybrid-space SENSE for EPI: Off-resonance and eddy current corrected joint interleaved blip-up/down reconstruction. Neuroimage 153, 97-108. doi:10.1016/j.neuroimage.2017.03.052

The invention claimed is:

1. A method for magnetic resonance imaging (MRI) comprising:

performing by an MRI apparatus an echo planar imaging acquisition using inverted up/down phase encoding directions and reconstructing acquired images having geometric distortions along the phase encoding directions due to off-resonant spins;

feed-forward estimating by a convolutional neural network (CNN) a phase distortion map from the acquired images;

wherein the CNN has a U-net architecture and is trained to minimize a similarity metric between un-warped up/down image pairs;

performing geometric distortion correction of the acquired images using the phase distortion map to unwarp the acquired images; wherein performing geometric distortion correction of the acquired images comprises unwarping the acquired images by 1d cubic interpolation along a phase encoding direction with density weighting to account for signal pile-up that takes place during training of the CCN.

2. The method of claim 1 wherein the U-net architecture of the CNN has an encoder section with encoder convolution layers having decreasing feature map dimensions, followed by a decoder section with decoder transposed convolution layers having increasing feature map dimensions.

3. The method of claim 2 wherein the decoder transposed convolution layers receive information flow from encoder convolution layers of corresponding dimensions, wherein the information flow comprises feature maps.

4. The method of claim 2 wherein at least one of the decoder transposed convolution layers receives an up-sampled distortion map estimated from a previous layer.

5. The method of claim 1 wherein the density weighting is estimated by counting contributions of neighboring points weighted by a linear distance metric.

* * * * *